April 30, 1929.  J. H. HUGHES  1,711,350
ROAD DRAG AND LAND LEVELER
Filed March 3, 1927    2 Sheets-Sheet 1
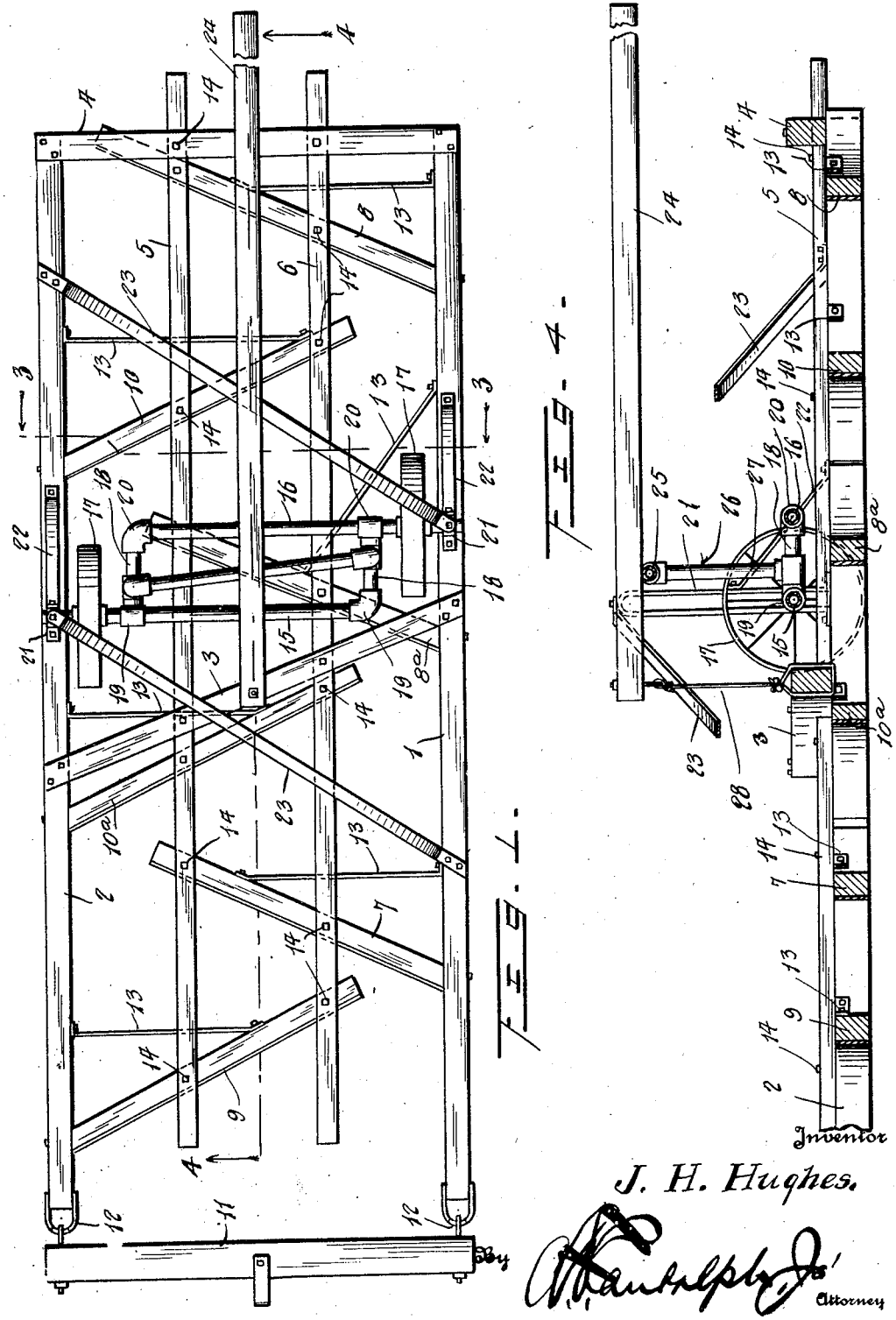
Inventor
J. H. Hughes.
Attorney

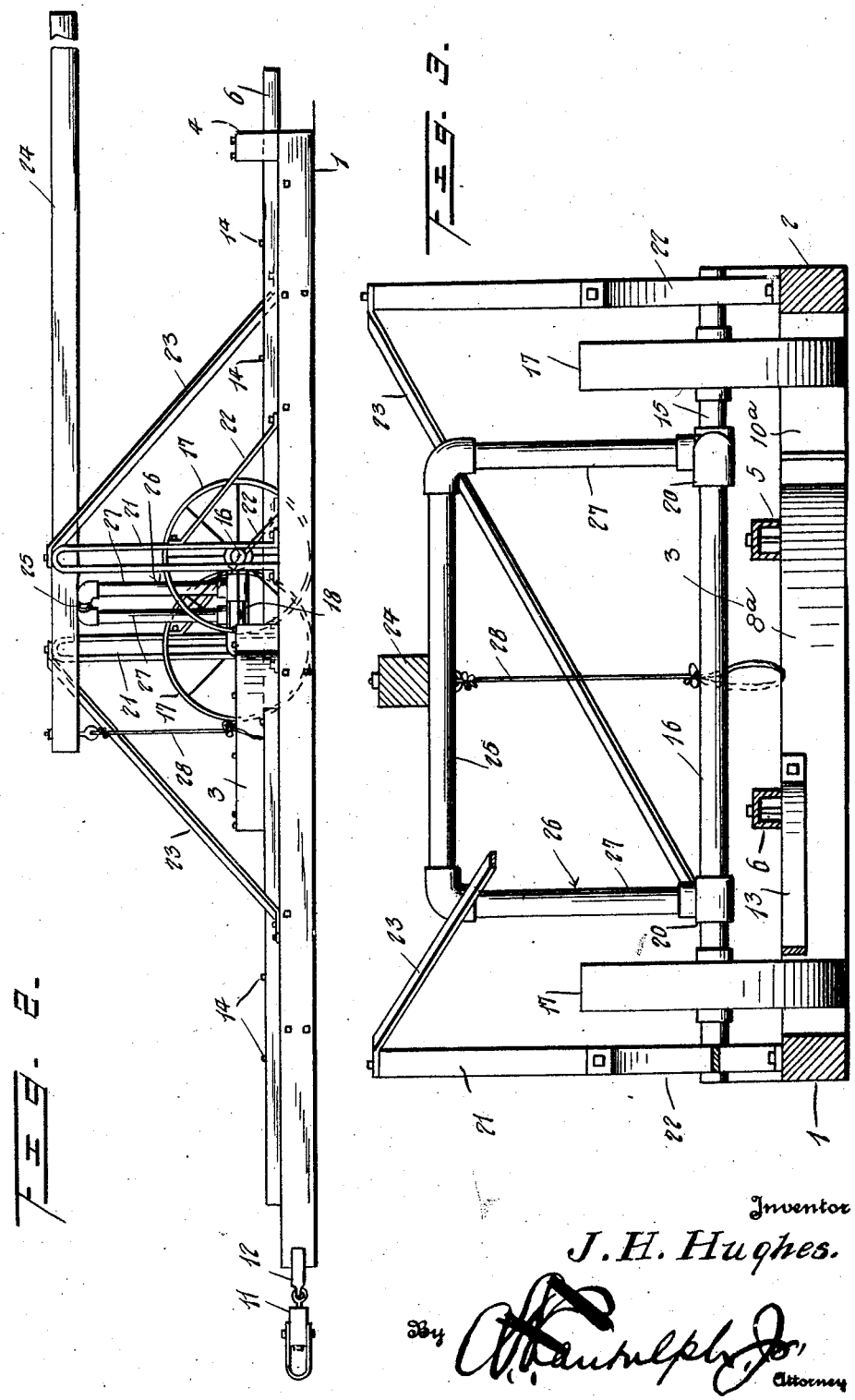

Patented Apr. 30, 1929.

1,711,350

UNITED STATES PATENT OFFICE.

JACOB H. HUGHES, OF WICHITA, KANSAS.

ROAD DRAG AND LAND LEVELER.

Application filed March 3, 1927. Serial No. 172,454.

This invention relates to and has for one of its objects to provide a novel and highly efficient drag which shall be adapted for road work and for leveling land for irrigation and which shall embody a construction adapted to prevent the formation of holes and to cause the loose earth to travel several times from side to side thereof during its passage therethrough so as to leave the ground in a fine, firm and level condition.

A further object of the invention is to provide a machine of the character stated which shall embody a carriage through the medium of which the drag may be raised or lowered to regulate the depth of cut or fill and moved from place to place out of contact with the ground.

The foregoing and other objects are attained by the construction, combination and arrangement of parts hereinafter fully described and claimed, and illustrated in the accompanying drawings, wherein:

Figure 1 is a top plan view of a combined road drag and land leveler constructed in accordance with my invention, Figure 2 is a view in side elevation of the machine, Figure 3 is a transverse sectional view taken on the vertical planes indicated by the line 3—3 of Figure 1, and Figure 4 is a longitudinal sectional view taken on the vertical plane indicated by the line 4—4 of Figure 1.

The machine comprises a drag which consists of runners 1 and 2 and cross bars 3 and 4. The runners 1 and 2 are of considerable length and spaced apart for a considerable distance. The cross bar 3 is positioned between the front and rear ends of the runners 1 and 2 and extends diagonally of the drag. The cross bar 4 is located at the rear ends of the runners 1 and 2 and extends directly across the drag. The cross bars 3 and 4 rest upon the runners 1 and 2, and channel bars 5 and 6, which extend longitudinally of the drag and are relatively spaced and spaced from the inner sides of the runners, are located below and secured to the cross bars. A front scraping blade 7, a rear scraping blade 8 and an intermediate scraping blade 8ª, are arranged between the runners 1 and 2 and secured to the runner 1. A front scraping blade 9, a rear scraping blade 10 and an intermediate scraping blade 10ª are arranged between the runners 1 and 2 and secured to the runner 2, and are positioned in advance of the scraping blades 7—8ª. The scraping blades 7—10ª are obliquely arranged and arranged in overlapping relation to cause the loose dirt to travel several times from side to side of the drag during its passage therethrough, with the result that the machine may be used for roadwork and for leveling land for irrigation. The length and width of the drag together with the number of scraping blades carried thereby, prevents the formation of holes.

The drag is provided with a draft bar 11 which extends transversely thereof and is loosely secured to the front ends of the runners 1 and 2 by clevises 12. In addition to being secured to the runners 1 and 2, the scraping blades 7—10ª are secured to the channel bars 5 and 6. The channel bars 5 and 6 not only strengthen and add rigidity to the drag but also assist braces 13 in adding strength and rigidity to the scraping blades 7—10ª. The braces 13 are secured to the runners 1 and 2 in rear of the scraping blades 7—10ª and to the rear sides of the scraping blades. Bolts 14 or any other suitable means may be employed for securing the runners, braces, channel bars, and scraping blades together.

The machine also comprises a carriage which consists of a front shaft 15 and a rear shaft 16 which are arranged in horizontally spaced relation and of which the outer end of one projects beyond the corresponding end of the other. The axles 15 and 16 have mounted thereon wheels 17, and are connected and held in spaced relation by bars 18 which are secured thereto by couplings 19 and 20. The carriage is connected to the runners 1 and 2 with its wheels 17 arranged between the same, by means of slotted standards 21 which are secured to the runners and in which the outer ends of the axles 15 and 16 are loosely positioned to permit the drag to move and be moved upwardly and downwardly with respect thereto. The standards 21 are supported by longitudinal braces 22 which are located at the rear sides thereof and each of which extends from a standard to the runner to which the standard is secured. The standards 21 are also supported by braces 23 which extend obliquely of the drag and of which each is secured to one runner and to the standard carried by the other. The standards 21 are located rearwardly of the transverse center of the drag, and one is located rearwardly of the other, and due thereto the drag cannot rock while being supported in elevated position. If desired the standards 21, as well as the wheels 17, may be arranged directly opposite each other.

The means for raising the drag and supporting it above the ground while the machine is being moved from place to place, comprises a lever 24 which extends longitudinally of the machine and is pivoted adjacent its front end to and upon the horizontal member 25 of a support 26 of inverted U-form and of which the vertical members 27 are secured to the axle connecting bars 18. The lever 24 is connected to the cross piece 3 by a cable 28. The lever 24 also permits the drag to be raised or lowered while the machine is in operation to regulate the depth of cut or fill. By depressing the rear end of the lever 24, the drag may be supported in a manner to deposit the accumulated dirt into a depression, and by reducing the weight on said end of the lever the drag is caused to bear more heavily on the ground with the result that a cut is made.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A road drag and land leveler comprising runners, front and rear cross bars connecting the runners and of which the former is obliquely arranged, channel bars positioned below said first bars and between the runners and arranged in spaced parallel relation to the runners, means securing said last named bars to the cross bars, scraping blades secured to one of the runners, scraping blades secured to the other runner and arranged in advance of the first named scraping blades, the scraping blades being arranged obliquely and those secured to one runner being arranged in overlapping relation to those secured to the other, the scraping blades being arranged below the channel bars, and means securing the scraping blades to the last named bars.

2. A machine of the character set forth, comprising a drag, slotted standards secured to opposite sides of the drag one in advance of the other, longitudinally and obliquely arranged braces secured to the sides of the drag and to the upper ends of the standards, horizontally spaced axles having their outer ends loosely positioned in the standards, wheels journaled on the axles, and means associated with the axles for raising and lowering the drag to regulate the depth of cut or fill.

3. A machine of the character set forth, comprising a drag, slotted standards secured to opposite sides of the drag one in advance of the other, horizontally spaced axles having their outer ends loosely mounted in the standards, wheels journaled on the axles, bars connecting the axles, an upright secured to the bars, a lever fulcrumed upon the upright, and an element connected to the lever and drag, said lever permitting the drag to be raised or lowered to regulate the depth of cut or fill.

4. A machine of the character set forth, comprising a drag, slotted standards secured to opposite sides of the drag, an axle having its ends loosely positioned in the standards, wheels journaled on the axle, a support of inverted U-form having its vertical members secured to the axle, and means associated with the horizontal member of the support and with the drag for raising and lowering the drag to regulate the depth of cut or fill.

In testimony whereof I affix my signature.

JACOB H. HUGHES.